United States Patent [19]

Snyder

[11] Patent Number: 4,919,025

[45] Date of Patent: Apr. 24, 1990

[54] METHOD AND APPARATUS FOR PROCESSING CONTINUOUSLY MANUFACTURED TUBING

[75] Inventor: George K. Snyder, Lockport, N.Y.

[73] Assignee: General Motors Corporation, Detroit, Mich.

[21] Appl. No.: 261,306

[22] Filed: Oct. 24, 1988

[51] Int. Cl.⁵ .............................................. B26D 3/16
[52] U.S. Cl. ........................................ 83/54; 83/236; 83/262; 83/355; 83/373; 83/436; 83/647.5
[58] Field of Search ................. 83/54, 71, 76, 236, 83/262, 355, 373, 436

[56] References Cited

U.S. PATENT DOCUMENTS

| | | | |
|---|---|---|---|
| 3,053,129 | 9/1962 | Aronson et al. | 83/236 |
| 3,085,457 | 4/1963 | Fischer et al. | 83/236 |
| 3,102,673 | 9/1963 | Aronson et al. | 83/236 |
| 3,655,856 | 4/1972 | Spivy | 83/236 |
| 3,882,744 | 5/1975 | McCarroll | 83/262 |
| 4,060,187 | 11/1977 | Grob | 83/236 |

*Primary Examiner*—Frank T. Yost
*Assistant Examiner*—Scott A. Smith
*Attorney, Agent, or Firm*—Ronald L. Phillips

[57] ABSTRACT

A continuously fed tube is momentarily halted at a cutting station and quickly cut by a rotating knife. The tube is continuously advanced from driving rollers to idler rollers and passes through intermediate pinch rollers which are cam controlled in synchronism with the cutting process to bow the tube at a rate which causes the tube portion at the cutting station to briefly stop during cutting. The cutter includes a planetary gear set having a carrier rotatable about a central axis which carries a knife for rotation about another axis while it revolves about the central axis. The knife makes many rotations per carrier revolution but is in position to cut the tube during one of the rotations.

6 Claims, 2 Drawing Sheets

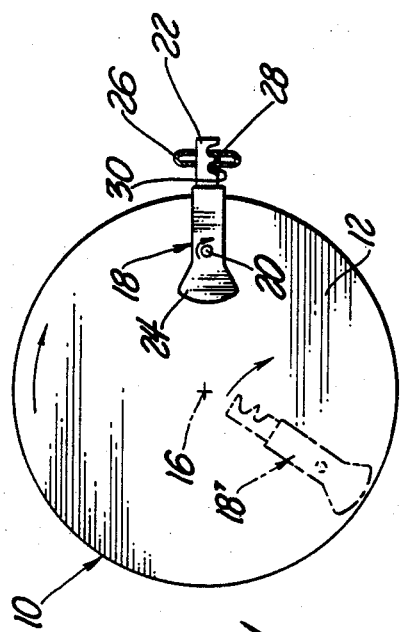
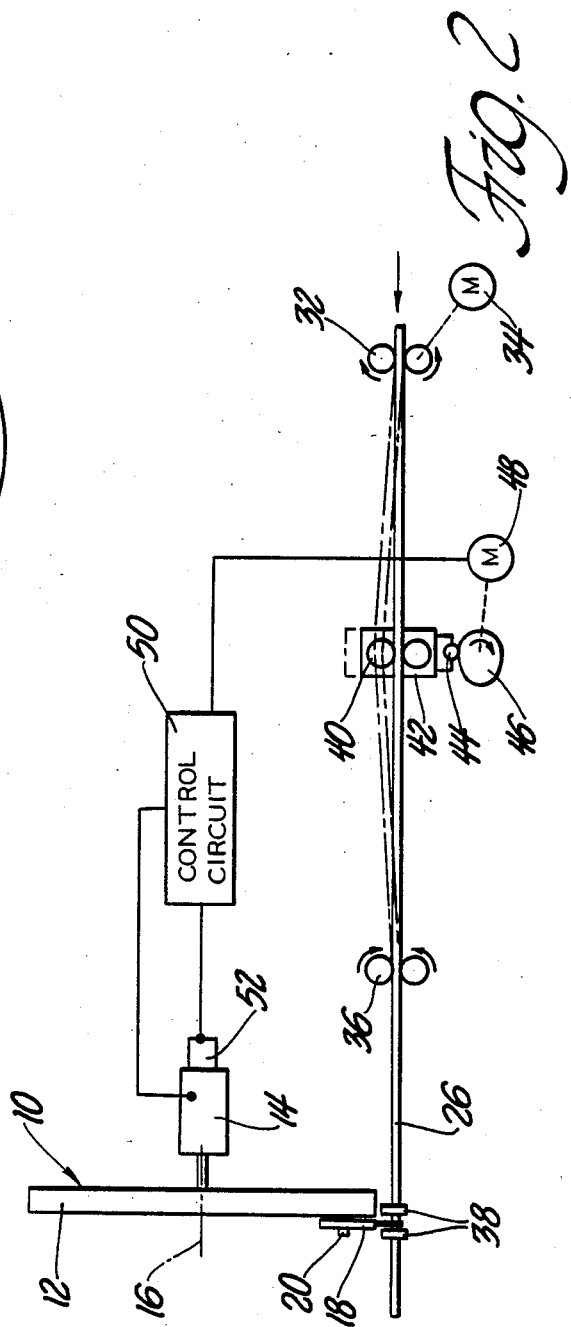

METHOD AND APPARATUS FOR PROCESSING CONTINUOUSLY MANUFACTURED TUBING

FIELD OF THE INVENTION

This invention relates to a method and apparatus for processing continuously manufactured tubing and particularly to a method and apparatus for feeding a continuously advancing tube for processing at a stationary site.

BACKGROUND OF THE INVENTION

In the manufacture of tubing, a continuous tube is emitted from a tube mill at a high speed and the tube is cut into desired lengths as needed for specified usage or for convenient storage or shipping. The conventional cutting method uses a guillotine type cutter which chops the tube in a downward motion and is then retracted by an upward motion. In order not to interfere with the continuous advance of the tube, the knife, carried on a shuttle, moves in the direction of tube advance during cutting and retracting. Then the shuttle must return the knife to a start position for the next cut. Thus the alternating motion in two directions, forward and back motion of the shuttle and knife as well as up and down motion of the knife, is inefficient from the standpoint of overcoming inertia when reversing the movements. The inertia is substantial due to the considerable mass of the cutting mechanism. In addition, the time required for such cutting procedure places a limit on the production rate of the tubing.

It has been proposed to use a rotary knife motion for such purposes wherein a knife is moved in an arc during the cut and is then stopped and restarted in time for the next cut. In this case, the inertia of the knife must be overcome twice for each cut. That proposal does not overcome the need to shuttle the knife mechanism back and forth to accommodate tube motion during the cut.

SUMMARY OF THE INVENTION

It is therefore an object of the invention to provide a method and apparatus for feeding a continuously supplied tube in a manner to briefly stop it at an operating station. It is another object to provide such a method and apparatus for feeding a continuously manufactured tube to a stationary station for an operation in a fixed plane.

The method of the invention is carried out in a process for the continuous manufacture of an elongated tube by the method of momentarily stopping the tube at an operation station comprising the steps of; guiding the elongated tube through a travel path prior to the operation station, periodically increasing the length of the travel path, controlling the rate of the path length increase to momentarily stop the advance of the tube to the operation station while feeding of the tube into the travel path continues, whereby for the duration of the stop a portion of the tube at the operation station is essentially stationary to facilitate an operation thereon.

The invention is also carried out by apparatus for momentarily stopping a portion of a continuously fed tube in an operation station for performing an operation thereon comprising; an operation station, driving rolls for continuously advancing a tube in the direction of the operation station, idler rolls between the driving rolls and the operation station, means for bowing the tube including a guide between the idler rolls and the driving rolls for moving the tube laterally, and control means for moving the guide at a rate with respect to the tube advance rate sufficient to momentarily stop the tube advance at the idler rolls while the tube is continually advanced at the driving rolls.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a schematic side view of a tube cutter mechanism for use with the tube feed arrangement of the invention, FIG. 2 is a schematic top view of the cutter of FIG. 1 and the tube feed and control mechanism according to the invention.

DESCRIPTION OF THE PREFERRED EMBODIMENT

Figure 3:
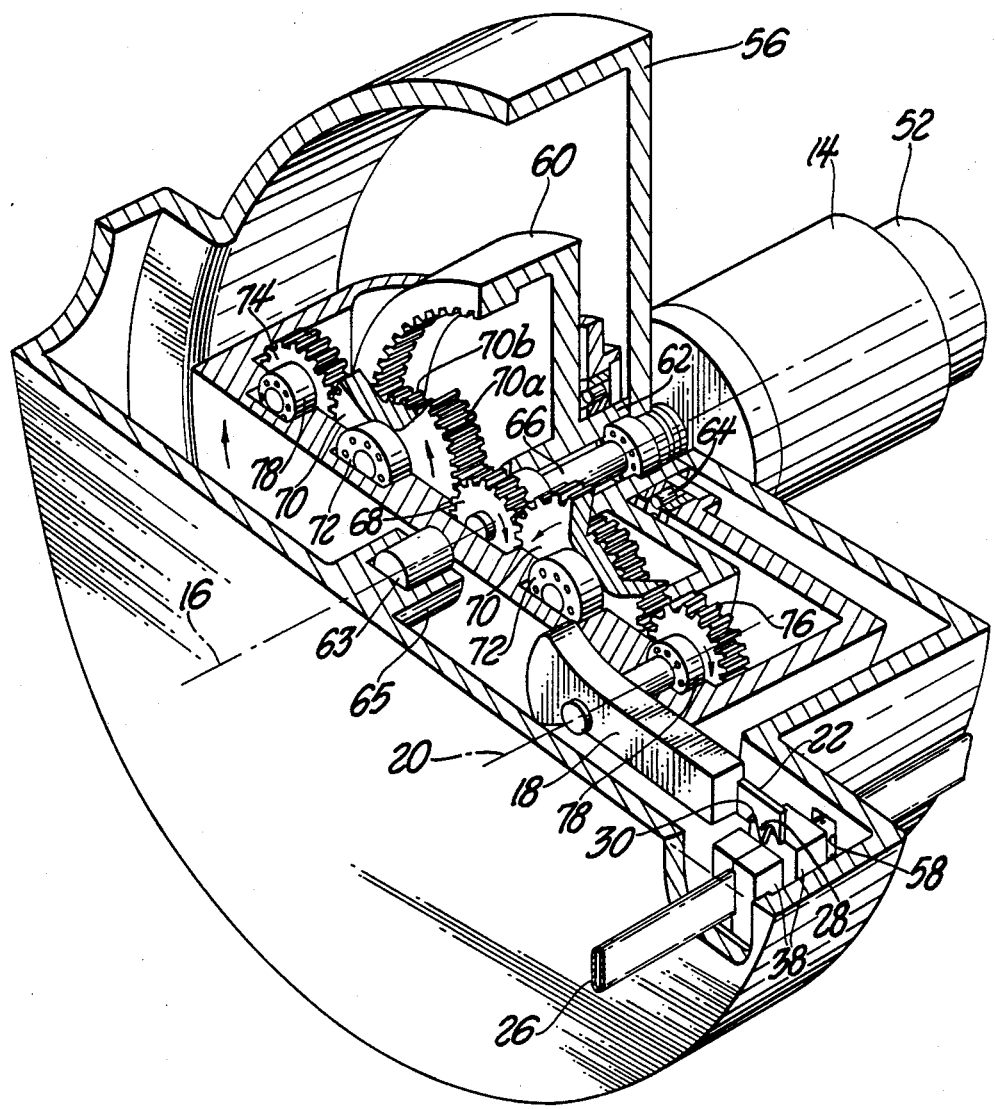
FIG. 3 is a partly broken away isometric view of the cutter mechanism of FIG. 1.

The tube feeding method and apparatus to be described are especially designed for facilitating tube cutting at a stationary station, however they also apply to other tube processing which can be done quickly at a stationary location. The invention recognizes that the cutting mechanism has greater inertia than the tube so that it is preferable to accelerate the tube rather than the cutting mechanism. The tube is accelerated laterally to bow the tube. The bow is described as a simple arcuate curve but may also be an S-shape or other curve.

Referring to the drawings, the cutter wheel 10 comprises a rotatable support 12 driven by a motor 14 for rotation about an axis 16. A knife 18 is pivotably mounted for rotation about an axis 20 and is rotatably driven by means to be described. The knife 18 is elongate and has a blade 22 at one end and a counterweight 24 at the other end. The blade 22 extends beyond the periphery of the support 12 when the knife is angularly disposed with the blade outward but the counterweight does not ever extend beyond the support. The tube 26 to be cut is shown in section in FIG. 1 and is a flat thin walled tube of metal such as aluminum which is readily cut by a single stroke of a rapidly moving blade. Preferably the blade is a well known structure called a Vogal knife which has a central cusp 28 for piercing the top of the tube and a curved concave blade portion 30 on either side of the cusp 28 for slicing through the side walls of the tube. The knife 18 is arranged to rotate about its axis 20 several times for each rotation of the support 12. An intermediate knife position is shown at 18'. The knife is in position to intersect the path of the tube 26 only once during each rotation of the support 12 and the successive knife rotations are idle, allowing time for the tube to advance to the next desired cut-off point.

The tube preferably originates from a tube mill, not shown, and advances at a constant preset speed. As shown in FIG. 2, the tube 26 is advanced by drive rollers 32, operated by a motor 34 and is guided toward the cutter station by idler rollers 36. The cutter station comprises the vicinity of the cutter wheel 10 and has two sets of die blocks 38 spaced on opposite sides of the path of the blade 22 for positioning and supporting the tube 26 during the cut. For the purpose of momentarily stopping the tube advance at the idler rollers and at the cutting station, a pair of pinch rollers 40 engage the tube midway between the drive rollers 32 and the idler rollers 36. The pinch rollers 40 are mounted on a slide 42 or the like for movement in a direction transverse to the tube advance movement. The slide 42 carries a cam follower 44 which is driven by a cam 46. The cam 46, in turn is rotated by a servomotor 48 controlled by a control circuit 50. The control circuit 50 also controls the motor 14 and has an input from a position encoder 52 on the motor 14 which reveals the cutter wheel position to the control circuit.

While the constant feed of the tube prevents stopping the tube altogether, transients can be introduced to the path of the tube to cause a momentary halt or hesitation of the tube at the idler rollers 36 without any disturbance to the constant feed at the drive rollers 32. By increasing the effective path length between the drive rollers and the idler rollers at the same rate as the tube feed, the tube advance at the idler rollers 36 is stopped for as long as the increase of path length can be sustained. Then if the path length is decreased to return the tube to the original path, the tube speed at the idler rollers will temporarily be higher than the normal speed. The cam, driven by the servomotor 48, is under control of the circuit 50 to rotate when the cutting action is about to take place thereby causing the pinch rollers 40 to bow the tube 26. The servomotor speed and the cam shape are calculated to effect the rate of displacement necessary to offset the advance during the increase of the path length so that the tube will be stationary at the cutting station for a brief time.

Typically the tube mill can be expected to produce tubing at a rate of 600 feet per minute. Assuming the tube is to be cut at 2 foot lengths, the wheel speed will be 300 rpm. For a distance of 10 inches between the two axes of rotation and a knife length of 6 inches from its axis to the cutting edge, the linear velocity component due to the wheel rotation will be 500 inches per second. If the knife rotates at 3000 rpm, that adds a velocity component of 1800 ips. If the tube height is 1⅜ inch and the blade height is 2 inches, the knife will be in contact with the tube for 0.00143 seconds. During that time the tube advance would be 0.172 inch. For a separation of six feet between the rollers 32 and 36, a bowing displacement of about 2.5 inch is adequate to produce the increased path length.

The details of the cutting wheel are shown in FIG. 3. A planetary gear set is used to rotate the knife 18 about its own pivot axis 20 and to revolve the knife about the axis 16 of the support 12. The support 12 is the planetary carrier for the gear set. A fixed housing 55 has a first cylindrical portion 56 which encloses the cuter wheel 10 and a second cylindrical portion 57 of greater diameter than the first which has room for knife rotation and has ports 58 which permit the tube 26 to pass through the cutting station. A stationary internal ring gear 60 is secured to the housing by a hollow hub 62. The carrier or support 12 is hollow and contains all the gears of the planetary gear set. The carrier has a generally cylindrical shape and has a hub aperture 61 which is rotatably mounted by bearings 64 on the outer surface of the hub 62. For additional support, the carrier has an axle 63 extending opposite the bearings 64 which is journaled within a tubular boss 65 in the housing 55. A shaft 66 is journaled in the hollow hub 62 and is driven at its outer end by the motor 14 and carries a sun gear 68 at its inner end. A pair of intermediate gears 70 are rotatably mounted on the carrier 12 by bearings 72 and each gear 70 is compound, having a large diameter gear portion 70a which meshes with the sun gear and a small diameter gear portion 70b which meshes with the internal ring gear. A pair of outer pinions 74 and 76, also carried by bearings 78 on the carrier 12, mesh with the large diameter gear portion 70a. The pinion 76 is coupled by a shaft 78 to the knife 18 for supporting and rotating the knife.

In operation, the motor 14 drives the sun gear 68 which causes the intermediate gears 70 to turn within the fixed ring gear 60 to drive the carrier 12. The motor rotation direction is chosen to rotate the carrier 12 in the cutting direction at the cutting station. The pinion 76 and the knife are driven in the same direction so that all the forces join to move the knife 18 in the cutting direction. As the carrier makes a single revolution, the knife 18 makes many rotations, perhaps 10 or 15, depending on the gear ratios selected. During one rotation the knife will be positioned by the carrier 12 to cut the tube 26 and during all the other rotations the knife will not be in position to touch the tube. Since the housing is stationary and no part of the cutter wheel 10 moves in the direction of the tube motion, the blade of the knife 18 is restricted to movement within a fixed plane and the tube, which is temporarily halted, is cut in that plane. The throughput of such a feeding and cutting arrangement is on the order of 600 feet per minute whereas the older style guillotine cutter and shuttle mechanism limited the throughput to 400 feet per minute.

The embodiments of the invention in which an exclusive property or privilege is claimed are defined as follows:

1. In a process for the continuous manufacture of straight tubes of predetermined precise length from straight resilient tube stock, the method of momentarily stopping the tube stock at a cutting station comprising the steps of:
   guiding the tube stock through a normally straight travel path to the cutting station,
   periodically momentarily increasing a predetermined length of the travel path so as to stretch a portion of the tube stock in advance of the cutting station,
   controlling the rate of the path length increase and thereby the amount of tube stock stretch to momentarily stop the advance of the tube stock at the cutting station while feeding of the tube stock along the travel path continues, whereby only for the duration of the momentary stop is the travel path increased and resultantly a portion of the tube stock at the cutting station measured from the leading end and encompassing the prescribed length is essentially stationary to facilitate a precise cutting operation thereon.

2. In a process for the continuous manufacture of straight tubes of predetermined precise length from straight resilient tube stock, the method of momentarily stopping the tube stock at a cutting station comprising the steps of:
   guiding the tube stock in a normally straight travel path between an entry point and an exit point in advance of the cutting station,
   elasticly deflecting the tube stock from its normally straight travel path between the entry and exit points to momentarily increase its path length therebetween while leaving that portion of the tube stock beyond the exit point free to travel a straight path to the cutting station;
   controlling the tube stock deflection to momentarily stop the advance of the leading tube portion past the exit point while feeding of the tube stock at the entry point continues, whereby only for the duration of the momentary stop is the tube stock deflected and resultantly that portion of the tube stock beyond the exit point is essentially stationary to facilitate a precise cutting operation thereon.

3. In a process for the continuous manufacture of straight tubes of predetermined precise length from straight resilient tube stock, the method of cutting the tubes from straight tube stock at a stationary cutting station comprising the steps of:
  guiding the tube stock in a normally straight path between an entry point and an exit point and then through the cutting station,
  periodically elasticly deforming the tube stock by flexing the tube stock at a location intermediate the entry and exit points while leaving that portion of the tube stock beyond the exit point free to travel the straight path to the cutting station,
  controlling the lateral movement to momentarily stop the advance of the tube stock past the exit point while feeding of the tube stock at the entry point continues, whereby only for the duration of the momentary stop is the tube stock bowed and resultantly a portion of the tube stock at the cutting station is essentially stationary, and
  cutting the tube stock during the time that the tube stock is momentarily stationary in the cutting station.

4. In a process for the continuous manufacture of straight flat walled tubes of predetermined precise length, the method of cutting the tubes from straight flat walled resilient tube stock at a stationary cutting station comprising the steps of:
  guiding the flat walled tube stock along a normally straight path between an entry point and an exit point and then through the cutting station,
  continuously rotating a tube cutting knife about an axis spaced from and parallel to the tube stock and periodically moving the knife through the path of the tube stock for cutting the tube stock,
  periodically elasticly bowing the tube stock by laterally moving the tube stock at a location intermediate the entry and exit points while leaving that portion of the tube stock beyond the exit point free to travel the straight path to the cutting station,
  controlling the lateral movement in synchronism with the knife movement to momentarily stop the advance of the tube stock past the exit point while feeding of the tube stock at the entry point continues, whereby that portion of the tube stock at the cutting station is essentially momentarily stationary when the knife cuts the tube stock.

5. Apparatus for momentarily stopping a portion of a continuously fed piece of straight resilient tube stock in a cutting station for performing a precise cutting operation thereon comprising;
  a cutting station,
  driving rolls for continuously advancing a piece of straight tube stock in the direction of the cutting station, the driving rolls comprising two rollers contacting opposite sides of the tube stock,
  drive means for driving one of the driving rollers,
  idler rolls between the driving rolls and the cutting station, the idler rolls comprising two rollers contacting opposite sides of the tube stock,
  means for elasticly bowing the tube stock including a guide between the idler rolls and the driving rolls for elasticly moving the tube stock laterally while leaving that portion of the tube stock beyond the idler rollers free to travel in a straight path to the cutting station, and
  control means for moving the guide at a rate with respect to the tube stock advance rate sufficient to momentarily stop the tube stock advance past the idler rolls and thereby at the cutting station for precise cutting while the tube stock is continually advanced at the driving rolls.

6. Apparatus for cutting a continuously fed piece of straight resilient tube stock at a stationary cutting station comprising;
  driving rolls for continuously advancing a piece of straight tube stock directly toward the cutting station,
  idler rolls between the driving rolls and the cutting station,
  a cutter at the cutter station for periodically cutting the tube stock,
  means for stopping the tube stock advance at the cutting station during the cutting including guide means for elasticly bowing the tube stock between the idler rolls and the driving rolls for moving the tube stock laterally, and control means for moving the guide means synchronously with the cutter period at a rate with respect to the tube stock advance rate sufficient to momentarily stop the tube advance past the idler rolls and thereby at the cutting station for precise cutting while the tube stock is continually advanced at the driving rolls.

* * * * *